US007003567B2

(12) United States Patent
Suzuki et al.

(10) Patent No.: US 7,003,567 B2
(45) Date of Patent: Feb. 21, 2006

(54) METHOD AND SYSTEM FOR DISPLAYING THE CONFIGURATION OF STORAGE NETWORK

(75) Inventors: Masao Suzuki, Yokohama (JP); Takaki Kuroda, Machida (JP)

(73) Assignee: Hitachi, Ltd., Tokyo (JP)

( * ) Notice: Subject to any disclaimer, the term of this patent is extended or adjusted under 35 U.S.C. 154(b) by 349 days.

(21) Appl. No.: 10/365,517

(22) Filed: Feb. 13, 2003

(65) Prior Publication Data
US 2003/0195953 A1   Oct. 16, 2003

(30) Foreign Application Priority Data
Apr. 10, 2002   (JP)   .............................. 2002-118367

(51) Int. Cl.
  *G06F 15/173*   (2006.01)
  *G06F 12/00*   (2006.01)
(52) U.S. Cl. .................. 709/224; 709/223; 711/114
(58) Field of Classification Search ................ 708/220; 709/223, 224, 220; 715/501.1, 733–736, 715/853–855, 1; 711/114
  See application file for complete search history.

(56) References Cited

U.S. PATENT DOCUMENTS

| | | | | |
|---|---|---|---|---|
| 6,009,466 | A * | 12/1999 | Axberg et al. ............... | 709/220 |
| 6,477,576 | B1 * | 11/2002 | Angwin et al. ............. | 709/226 |
| 6,480,901 | B1 * | 11/2002 | Weber et al. ................ | 709/246 |
| 6,496,859 | B1 * | 12/2002 | Roy et al. .................... | 709/223 |
| 6,542,961 | B1 * | 4/2003 | Matsunami et al. ........ | 711/114 |
| 6,606,690 | B1 * | 8/2003 | Padovano ................... | 711/148 |
| 6,636,239 | B1 | 10/2003 | Arquie et al. | |
| 6,636,499 | B1 * | 10/2003 | Dowling ..................... | 370/338 |
| 6,665,714 | B1 * | 12/2003 | Blumenau et al. .......... | 709/222 |
| 6,697,924 | B1 * | 2/2004 | Swank ........................ | 711/163 |
| 6,742,059 | B1 * | 5/2004 | Todd et al. ................... | 710/19 |
| 6,769,022 | B1 * | 7/2004 | DeKoning et al. .......... | 709/223 |
| 6,839,747 | B1 * | 1/2005 | Blumenau et al. .......... | 709/223 |
| 6,845,395 | B1 * | 1/2005 | Blumenau et al. .......... | 709/223 |
| 6,854,035 | B1 * | 2/2005 | Dunham et al. ............. | 711/117 |
| 6,892,264 | B1 * | 5/2005 | Lamb ......................... | 710/301 |
| 2002/0170004 | A1 | 11/2002 | Parrett et al. | |
| 2003/0055932 | A1 * | 3/2003 | Brisse ........................ | 709/223 |
| 2003/0085914 | A1 | 5/2003 | Takaoka et al. | |
| 2003/0101261 | A1 | 5/2003 | Ikeda et al. | |
| 2003/0146929 | A1 | 8/2003 | Baldwin et al. | |
| 2003/0179227 | A1 * | 9/2003 | Ahmad et al. .............. | 345/736 |
| 2003/0184580 | A1 * | 10/2003 | Kodosky et al. ............ | 345/734 |
| 2003/0191825 | A1 | 10/2003 | Miyazaki et al. | |

* cited by examiner

*Primary Examiner*—Marc D. Thompson
*Assistant Examiner*—Yemane M. Gerezgiher
(74) *Attorney, Agent, or Firm*—Mattingly, Stanger, Malur & Brundidge, P.C.

(57) ABSTRACT

It is an object of the present invention to provide the function for displaying the configuration of storages not in a form peculiar to a storage system but in a more general purpose system. The present invention provides a method and system for displaying the configuration of a storage network, wherein each piece of apparatus constituting the storage network is connected to a control network different from the storage network connecting the pieces of apparatus to one another, and configuration information about each piece of apparatus is acquired using the control network, and a screen for displaying the configuration of the storage network is generated and displayed based on the acquired configuration information.

6 Claims, 12 Drawing Sheets

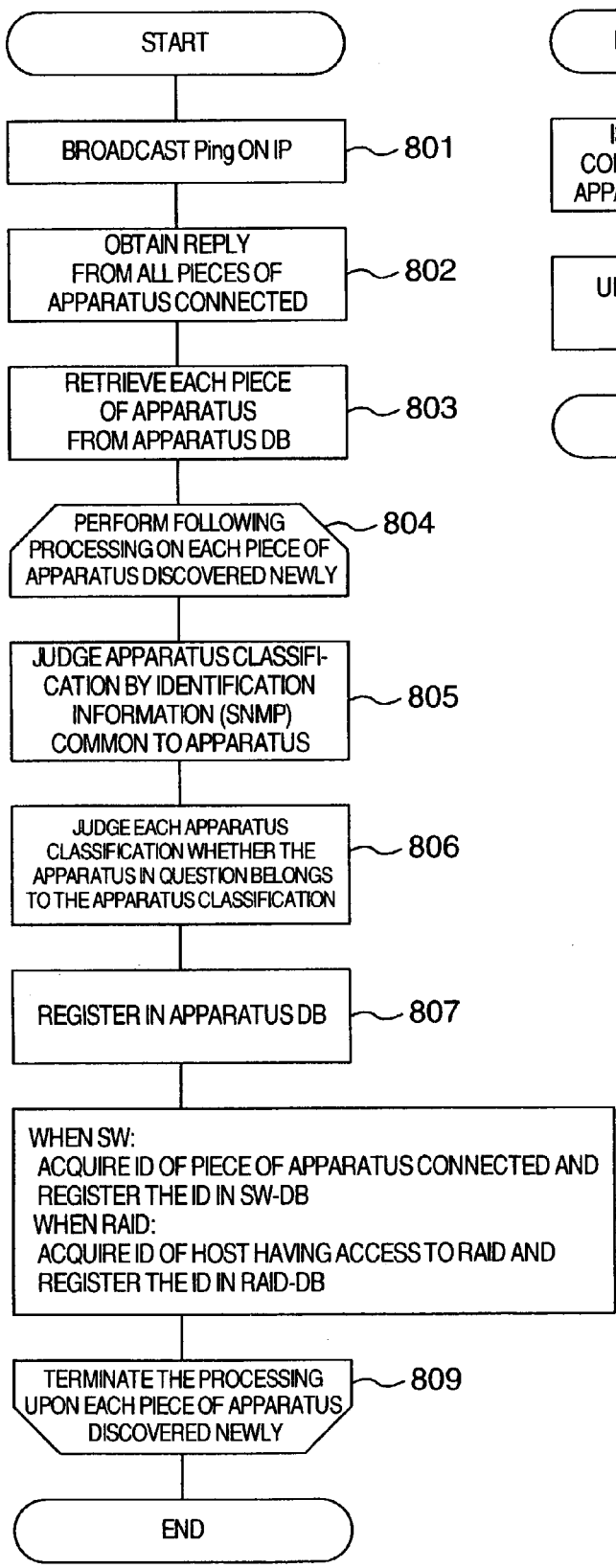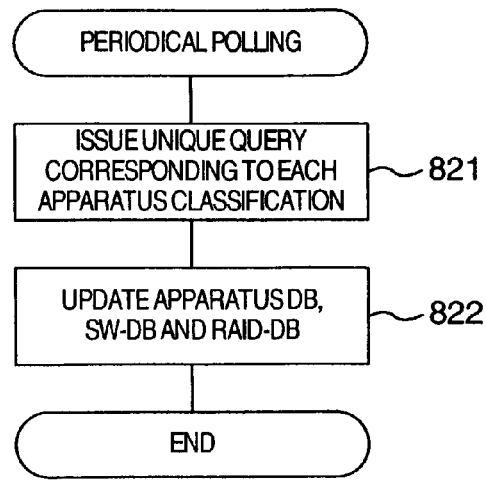

FIG.9A

APPARATUS DB

| APPARATUS ID (IP ADDRESS) | ADMINISTRATION TARGET FLAG | APPARATUS CLASSIFICATION |
|---|---|---|
| | | |

| APPARATUS ID (IP ADDRESS) | PORT ID | CONNECTED APPARATUS ID |
|---|---|---|
| | | |

FIG.9C

RAID-DB

| APPARATUS ID (IP ADDRESS) | PORT ID | LU ID | LDEV | CONNECTED HOST ID |
|---|---|---|---|---|
| | | | | |

FIG.9D

HOST DB

| APPARATUS ID (IP ADDRESS) | FS | RAID PORT | RAID LU ID |
|---|---|---|---|
| | | | |

DATA EXAMPLE OF HOST DB

| APPARATUS ID | FS | RAID PORT | RAID LU ID |
|---|---|---|---|
| 200 | E:¥ | 111 | 01 |
| 200 | F:¥ | 500 | 01 |
| 400 | /RAID | 111 | 02 |
| 900 | /RAID2 | 111 | 03 |
| 201 | D:¥ | 112 | 02 |

FIG.12

DATA EXAMPLE OF SW-DB

| APPARATUS ID | PORT ID | CONNECTED APPARATUS ID |
|---|---|---|
| SW1 | 001 | 111 |
| SW1 | 002 | SW2 |
| SW1 | 003 | 200 |
| SW1 | 004 | 900 |
| SW2 | 001 | SW1 |
| SW2 | 002 | 400 |
| SW2 | 003 | 500 |

FIG.13

DATA EXAMPLE OF RAID-DB

| APPARATUS ID | PORT ID | LU ID | LDEV | CONNECTED APPARATUS ID |
|---|---|---|---|---|
| R1 | 111 | 01 | L1 | 200 |
| R1 | 111 | 02 | L3 | 400 |
| R1 | 111 | 03 | L2 | 900 |
| R1 | 112 | 02 | L2 | 201 |
| R2 | 500 | 01 | L1 | 200 |

METHOD AND SYSTEM FOR DISPLAYING THE CONFIGURATION OF STORAGE NETWORK

BACKGROUND OF THE INVENTION

The present invention relates to a method and system for displaying the configuration of storages on an IP network administration system.

In recent years, the demand for introduction of storage administration systems is increased with the demand for storage systems increasing due to the gigantism of corporate databases. As a storage system, SAN (Storage Area Network) that is a system in which storages are connected through a network is known. In a typical SAN, storages are connected through fiber channel switches. Some SANs have a storage view display function. This function is to display on a screen what storages have been connected to the SAN.

The aforementioned storage view display function in SAN is to collect information through an interface peculiar to each storage system and display the collected information. That is, the function is an additional function provided not in common to companies providing storage systems but uniquely by a company providing the storage system in question. Therefore, the function can simply display information that can be collected only through the peculiar interface. Accordingly, the configuration of connected storage systems as a whole, for example, concerning what disc has been connected to which switch, cannot be known.

SUMMARY OF THE INVENTION

It is an object of the present invention to provide the function for displaying the configuration of storages not in a form peculiar to a storage system but in a more general purpose system.

In order to attain the foregoing object, the present invention provides a method and system for displaying the configuration of a storage network, wherein each piece of apparatus constituting the storage network is connected to a control network different from the storage network connecting the pieces of apparatus to one another, configuration information of each piece of apparatus is acquired using the control network, and a screen showing the configuration of the storage network is generated and displayed on the basis of the acquired configuration information.

As the control network, a TCP/IP network used in the related art may be used.

Other objects, features and advantages of the invention will become apparent from the following description of the embodiments of the invention taken in conjunction with the accompanying drawings.

BRIEF DESCRIPTION OF THE DRAWINGS

FIGS. 8A and 8B are flow charts showing an example of a method for collecting information for displaying a storage configuration display screen;

FIGS. 9A to 9D are views showing the configurations of respective DBs;

FIG. 12 is a view showing an example of a switch DB in the aforementioned configuration example;

FIG. 13 is a view showing an example of a PAID-DB in the aforementioned configuration example.

DETAILED DESCRIPTION OF THE EMBODIMENTS

An embodiment of the present invention will be described below in detail with reference to the drawings.

Figure 1:
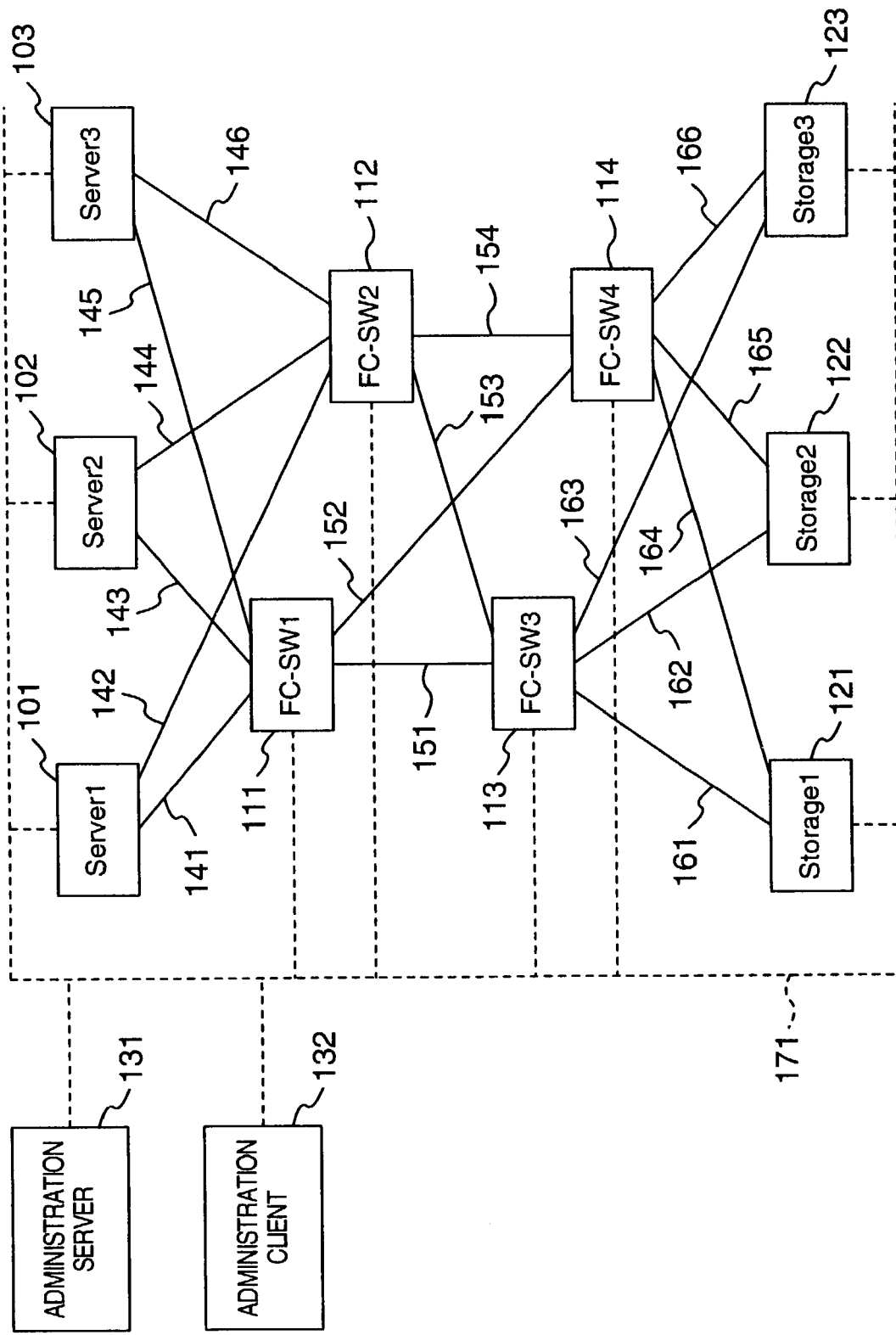
FIG. 1 is a diagram showing an example of a storage network system to which a method for displaying the configuration of storages according to the present invention is applied.

FIG. 1 shows an example of a storage network system to which a method for displaying the configuration of storages according to the present invention is applied. This system includes host computers (hereinafter referred to as "hosts") 101, 102 and 103, fiber channel switches (hereinafter referred to as "switches") 111, 112, 113 and 114, disk units (storages) 121, 122 and 123, an administration server 131, and an administration client 132. A SAN is constituted by the switches 111, 112, 113 and 114 and the disk units 121, 122 and 123.

The hosts 101, 102 and 103 are connected to the switches 111 and 112 through SCSI lines 141 to 146. The switches 111 and 112 are connected to the switches 113 and 114 through fiber channels 151 to 154 while the switches 113 and 114 are connected to the disk units 121, 122 and 123 through fiber channels 161 to 166. In addition, each of these pieces of apparatus is connected to a network designated by the broken line 171. The protocol of the network 171 is TCP/IP. The TCP/IP network 171 is provided to control the configuration or the like of each piece of apparatus or to detect a failure of each piece of apparatus. For example, a group of commands for control using Telnet has been defined for each switch so as to control the switch. In this embodiment, the TCP/IP network 171 is used to acquire configuration information of the storage network and display the acquired configuration information.

The administration server 131 is a server for carrying out processing of acquiring and displaying the configuration information of the storage network. The administration client 132 gains access to the administration server 131, gives the administration server 131 an instruction to display the configuration information of the storage network, and displays a screen of the configuration information of the storage network transmitted by the administration server 131 in response to the instruction.

Figure 2A:
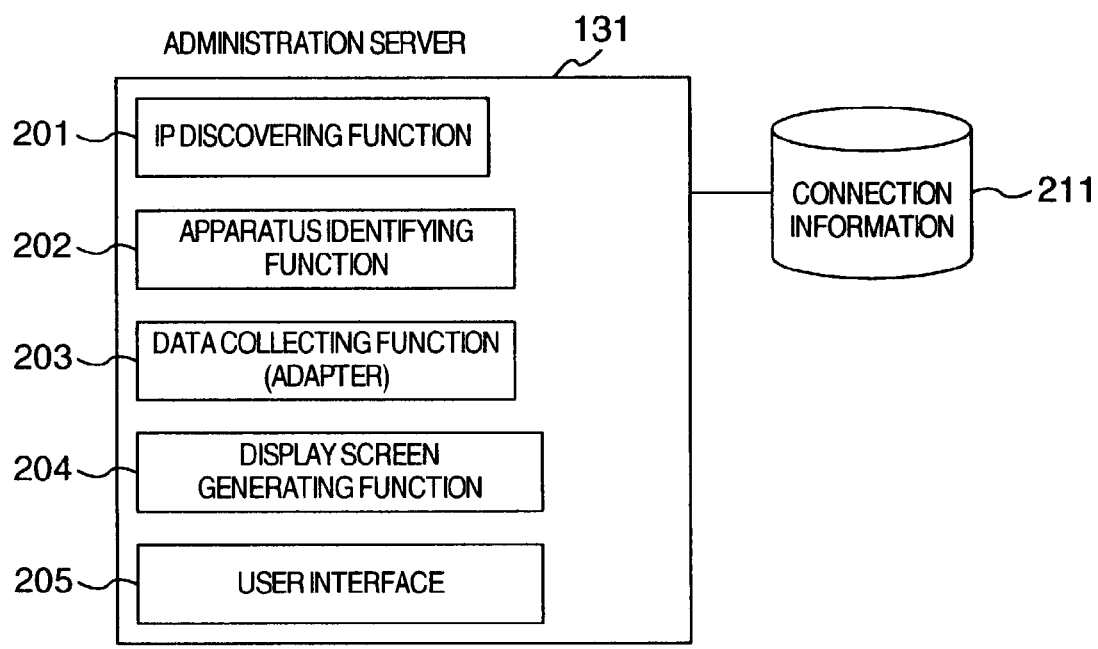
FIGS. 2A and 2B are diagrams showing the schematic configurations of an administration server and an administration client respectively.
Figure 2B:
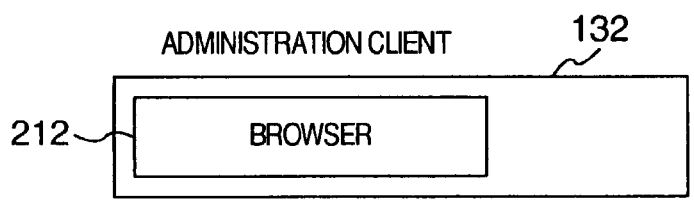

FIGS. 2A and 2B show the schematic configurations of the administration server 131 and the administration client 132 respectively. The administration server 131 has an IP discovering function 201, an apparatus identifying function 202, a data collecting function (adapter) 203, a display screen generating function 204, a user interface 205 and a connection information storage portion 211. The IP discovering function 201 is a function to issue a Ping to a broadcast address through the TCP/IP network 171 so as to automatically discover IP addresses of pieces of apparatus making a reply to the Ping. The apparatus identifying function 202 is a function to identify apparatus classification on the basis of identification information (SNMP) common to each piece of apparatus. The apparatus classification includes an identification of a host, a switch or a disk unit, and further a maker name, RAID information, etc. as to the switch or the disk unit. The data collecting function 203 is a function implemented by an adapter for each classification of apparatus. By the attempt to gain unique access to each piece of apparatus through its corresponding adapter, the classification of the piece of apparatus can be known, or various kinds of information about the piece of apparatus can be acquired. The display screen generating function 204 is a function to generate a screen for displaying the configuration information of the storage network collected by use of the functions 201 to 203 and the like. The user interface 205 is in charge of processing between the administration server 131 and the administration client 132, such as accepting an instruction from the administration client 132, and replying to the instruction with a screen corresponding thereto. The connection information storage portion 211 is storage means for storing the collected configuration information of the storage network.

The administration client 132 has a browser 212. Through the browser 212, the instruction to display the configuration information of the storage network is given to the administration server 131, and the configuration information display screen transmitted by the administration server 131 is displayed.

Examples of display screens of the configuration information of a storage network which can be displayed in accordance with an instruction given to the administration server 132 by the administration client 131 will be described with reference to FIGS. 3 to 7.

Figure 3:
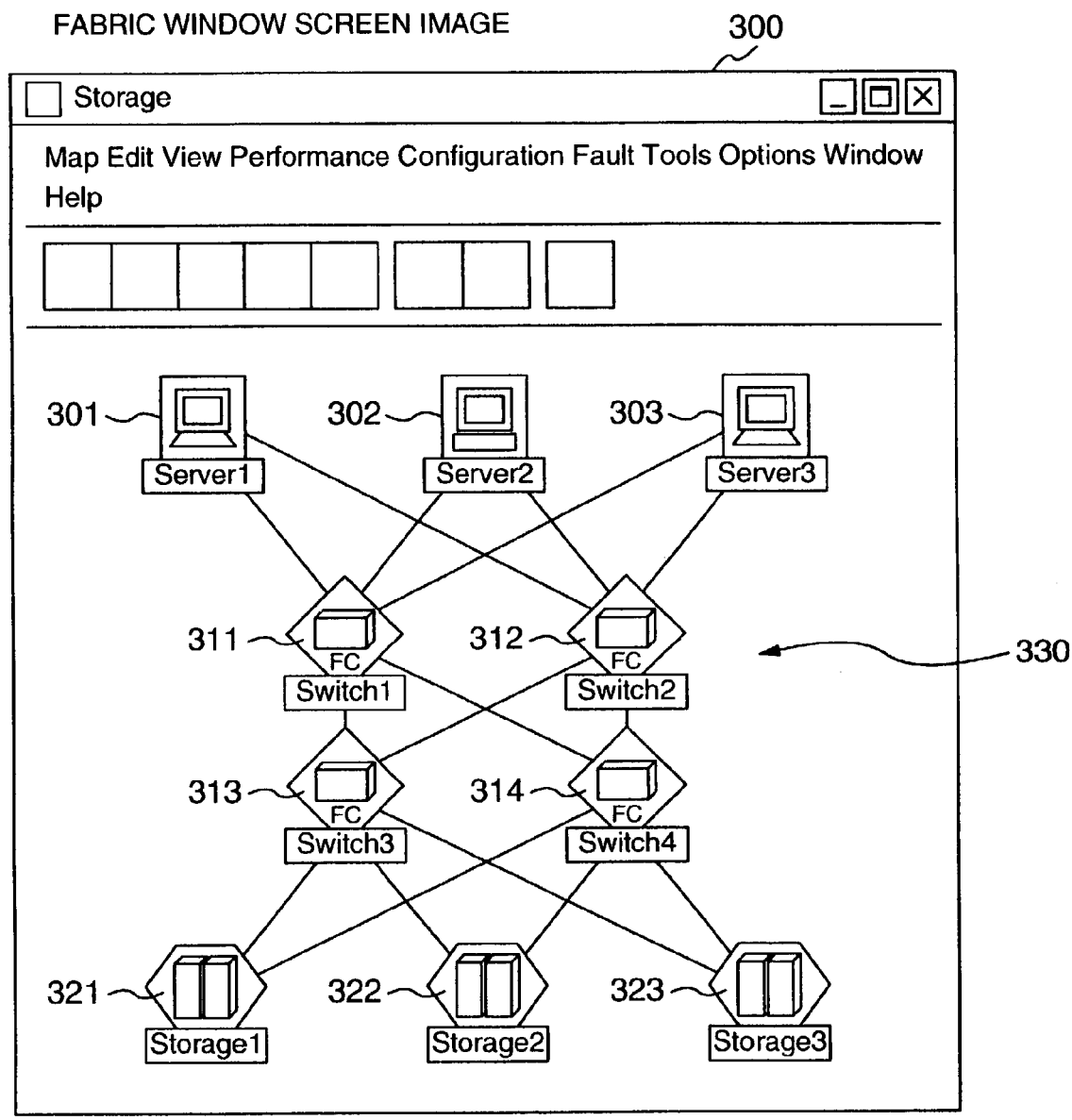
FIG. 3 is a view showing an example of a screen image in a fabric window.

FIG. 3 shows an example of a screen image of a fabric window. A fabric window 300 displays a fabric view 330 in a display area. The fabric view 330 displays hosts, switches and disk units connected in the SAN, and the connection state of cables for connecting those pieces of apparatus physically. FIG. 3 displays the fabric view of a system having the configuration of FIG. 1. Therefore, FIG. 3 has a connection configuration corresponding to FIG. 1.

Figure 4:
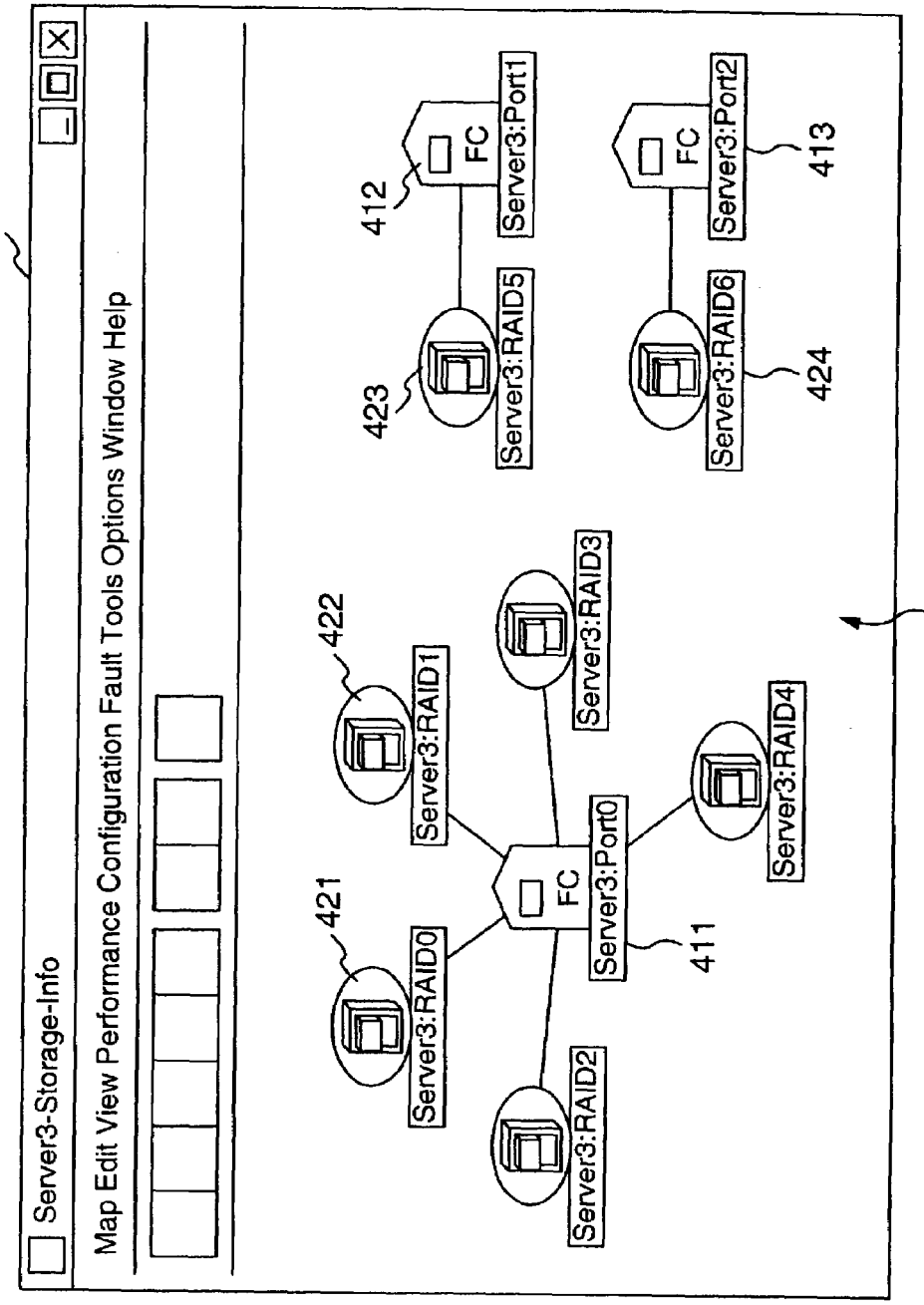
FIG. 4 is a view showing an example of a screen image in a host window.
Figure 5:
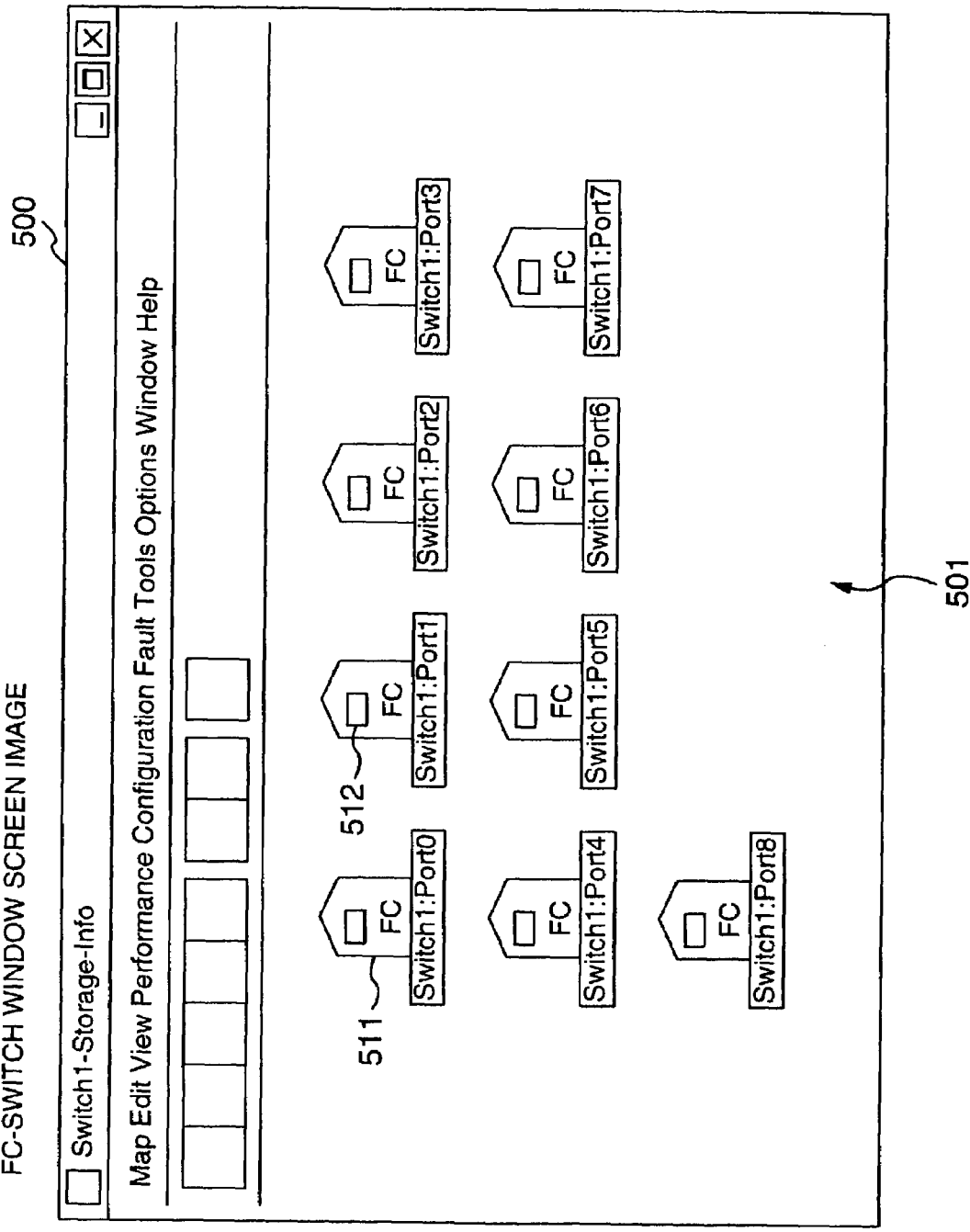
FIG. 5 is a view showing an example of a screen image in a fiber channel switch (FC-SW) window.
Figure 6:
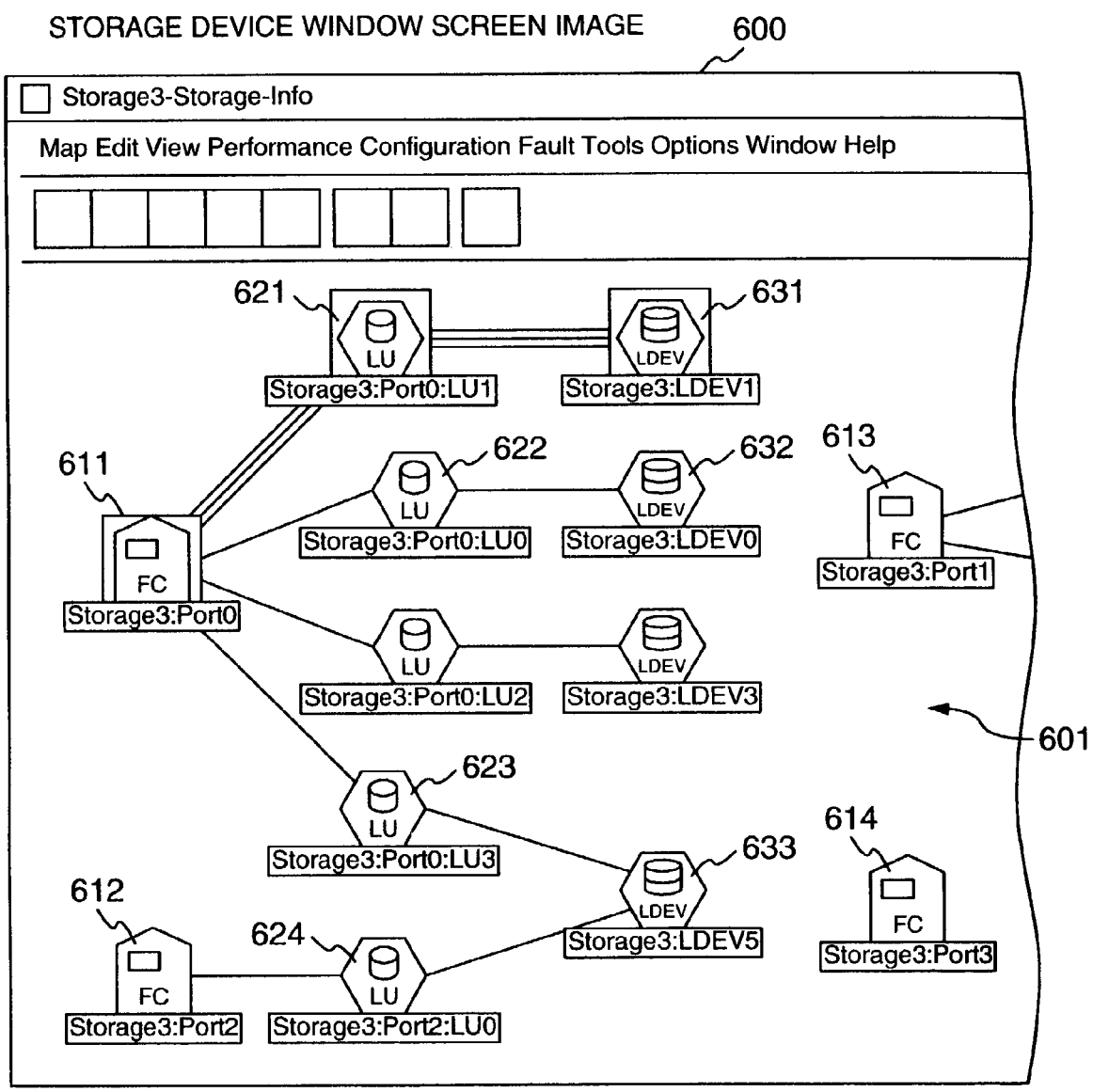
FIG. 6 is a view showing an example of a screen image in a storage device window.
Figure 7:
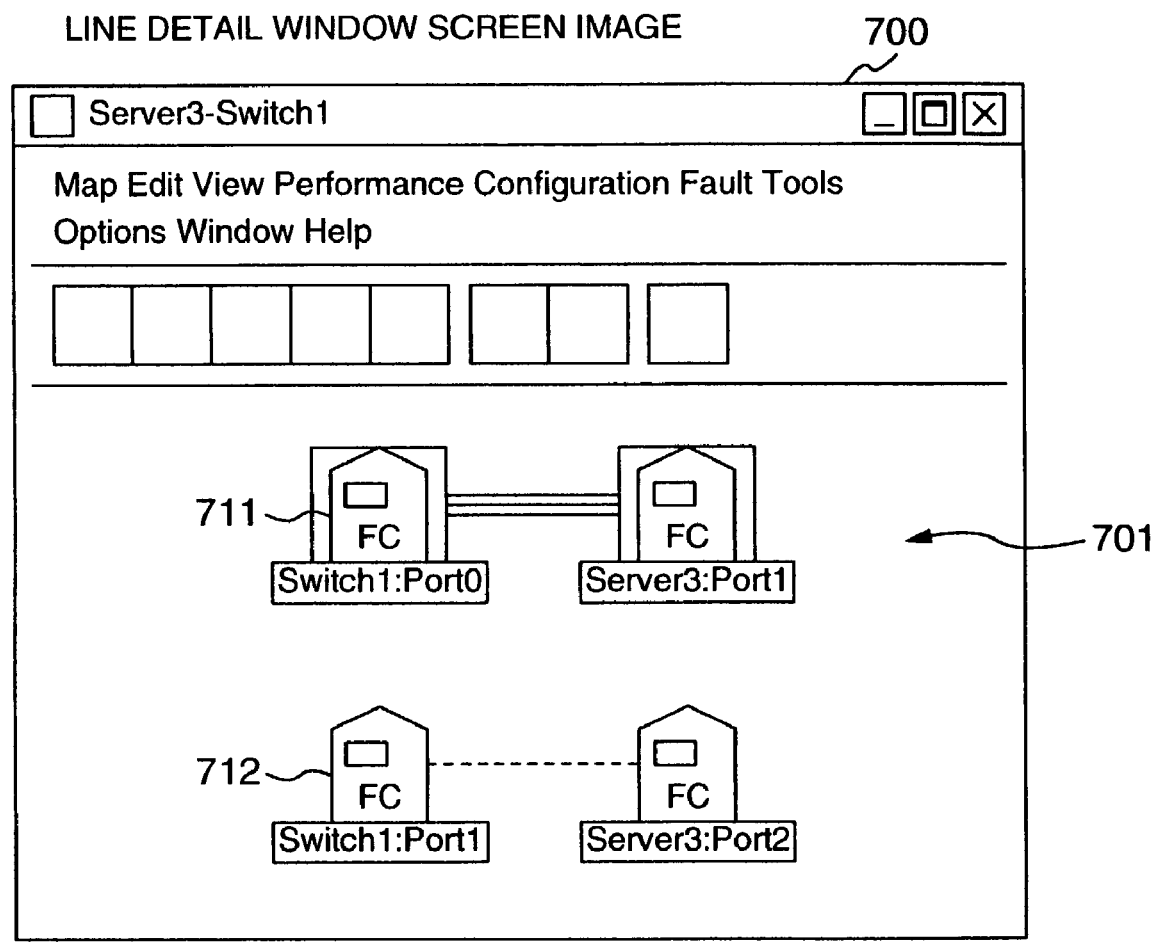
FIG. 7 is a view showing an example of a screen image in a line detail window.

In FIG. 3, when a symbol 301, 302 or 303 of the host is double-clicked, a host window of FIG. 4 is displayed. When a symbol 311, 312, 313 or 314 of the switch is double-clicked, a fiber channel switch (FC-SW) window of FIG. 5 is displayed. When a symbol 321, 322 or 323 of the disk unit is double-clicked, a storage device switch window of FIG. 6 is displayed. When a connection line connecting pieces of apparatus is double-clicked, a line detail window of FIG. 7 is displayed.

FIG. 4 shows an example of a screen image in the host window. A host view 401 is displayed in a host window 400. The host view 401 displays storage information of a selected host. FIG. 4 shows a host view of the host 303 (Server 3) of FIG. 3, displaying storages connected to Server 3. The symbols 411 to 413 designate HBAs (Host Bus Adapters) of Server 3. The symbols 421 and 422 designate volumes indicating disk units (RAID) that can be recognized through one HBA 411 of the Server 3. The symbol 423 designates a volume indicating a disk unit that can be recognized through another HBA 412 of Server 3. The symbol 424 designates a volume indicating a disk unit that can be recognized through a further HBA 413 of Server 3. From the host view 401, it is known which disk unit has been mounted in a specified host. When a symbol of volume information is double-clicked, the storage device window of FIG. 6 is displayed.

FIG. 5 shows an example of a screen image in the fiber channel switch (FC-SW) window. An FC-SW view 501 is displayed in an FC-SW window 500. The FC-SW view 501 displays port information of a selected switch. The symbols 511, 512 and the like designate ports of the selected Switch 1.

FIG. 6 shows an example of a screen image in the storage device window. A storage device view 601 is displayed in a window 600. The storage device view 601 displays storage information (channel adapter information, logical unit/logical device information, etc.) of a selected storage device (disk unit with one housing).

FIG. 6 displays storage information of Storage 3 of the disk unit 323 in FIG. 3. The symbols 611 to 614 designate channel adapters of Storage 3. The symbol 621 or 622 designates the ID of an LU (Logical Unit) of a RAID accessible through the channel adapter designated by the symbol 611. The symbol 631 designates a logical device for the logical unit ID designated by the symbol 621. The symbol 632 designates a logical device for the logical unit ID designated by the symbol 622. The symbol 623 or 624 designates the ID of an LU in the same manner as the symbol 621 or 622. The symbol 633 designates a logical device corresponding to the logical units designated by the symbols 623 and 624. The device 633 is shared by the logical units 623 and 624. In such a manner, the configuration in which two logical units correspond to one and the same logical device, though through different channel adapters and different LU IDs, is recognized at a glance from the view of FIG. 6.

Incidentally, when a symbol of a volume in the host view of FIG. 4 is double-clicked, the storage device view of FIG. 6 is displayed. On this occasion, a channel adapter, a logical unit and a logical device linked to the double-clicked symbol are highlighted. FIG. 6 shows an example in which the portion from the symbol 611 to the symbol 631 via the symbol 621 is highlighted.

FIG. 7 shows an example of a screen image in the line detail window. A line detail view 701 is displayed in a window 700. The line detail view 701 displays a state of a selected connection line and information about ports at both ends of the selected connection line. Each display 711 or 712 shows the case where the connection line connecting Switch 1 (311) and Server 3 (303) is double-clicked. The display 711 shows the case of a display from a view with a specified zone which will be described later. In the display 711, symbols belonging to the zone are highlighted. The display 712 shows the case where consistency is lost due to an error in definition or the like. In the display 712, the connection line is indicated by the broken line.

FIGS. 8A and 8B show an example of a method for collecting information for displaying storage configuration display screens as shown in FIGS. 3 to 7. This example shows the procedure to be executed by the administration server.

FIG. 8A shows the procedure for the administration server 131 to acquire the configuration information in accordance with necessity. In Step 801, a ping is broadcast by use of the TCP/IP network 171. In Step 802, a reply (IP address) is obtained from each connected piece of apparatus. In Step 803, the acquired IP address is retrieved from the apparatus database (DB).

FIG. 9A shows the configuration of the apparatus DB. The apparatus DB is stored in the connection information storage portion 211. The apparatus DB has an apparatus ID (IP address) field, an administration target flag field and an apparatus classification field. An IP address of a piece of apparatus in this system is registered in the apparatus ID field. The administration target flag field stores a flag indicating whether the piece of apparatus of the IP address is put into a target of administration or not. The apparatus classification field stores classification information including an identification of a host, a switch or a disk unit, and further a maker name, RAID information, etc. as to the switch or the disk unit.

Return to FIG. 8A. When there is an IP address discovered newly as a result of the retrieval of Step 803, Steps 804 to 809 are executed upon the piece of apparatus corresponding to the IP address. First, in Step 805, apparatus classification is determined from identification information (SNMP) common to each piece of apparatus. This is processing to issue a query common to each piece of apparatus by use of the protocol of SNMP so as to determine the apparatus classification. As a result, when the apparatus classification can be determined, the routine of processing skips Step 806 and advances to Step 807. When the apparatus classification cannot be determined in Step 805, it is judged in Step 806 for each apparatus classification whether the piece of apparatus in question belongs to the apparatus classification or not. That is, by attempting unique access to the newly discovered piece of apparatus through an adapter for each apparatus classification, the classification of the piece of apparatus in question is determined. When the apparatus classification can be determined in Step 806, in Step 807, the piece of apparatus in question is registered in the apparatus DB explained in FIG. 9A.

Further, in Step 808, processing for collecting information for each apparatus classification is performed. That is, when the newly discovered piece of apparatus is a switch, the ID of a piece of apparatus connected to the switch is acquired and registered in the switch DB. To this end, a query is issued to the switch by access unique thereto so as to acquire information about what piece of apparatus is connected to which port.

FIG. 9B shows the configuration of the switch DB. The switch DB is stored in the connection information storage portion 211. The switch DB is a DB containing an apparatus ID (IP address) field, a port ID field and a connected apparatus ID field. The IP address of the switch in question is registered in the apparatus ID field. The port of the switch in question is registered in the port ID field. The apparatus ID of a piece of apparatus connected to the port is registered in the connected apparatus ID field.

When the newly discovered piece of apparatus is a RAID in Step 808, the ID of a host having access to the RAID is acquired and registered in the RAID-DB. To this end, a query is issued to the RAID by access unique thereto so as to acquire information about which host has access to disks of the RAID.

FIG. 9C shows the configuration of the RAID-DB. The RAID-DB is stored in the connection information storage portion 211. The RAID-DB is a DB containing an apparatus ID (IP address) field, a port ID field, an LU (Logical Unit) ID field, an LDEV (Logical Device) ID field and a connected host ID field. The IP address of the RAID in question is registered in the apparatus ID field. The port of the RAID in question is registered in the port ID field. The ID of a logical unit is registered in the LU ID field. The ID of a logical device corresponding to the ID of the port and the ID of the LU is registered in the LDEV ID field. The apparatus ID of a host connected to the port ID and the LU ID is registered in the connected host ID field.

FIG. 8B shows processing for updating the DBs based on periodical polling. In Step 821, a query unique to each apparatus classification is issued to check whether the configuration information has been updated or not. When the DBs have to be updated, the DBs are updated in Step 822.

FIGS. 9A to 9D show the configurations of the DBs to be stored in the connection information storage portion 211. FIGS. 9A to 9C were described above. FIG. 9D shows a host DB. The host DB is a DB containing an apparatus ID (IP address) field, a file system (FS) field, a RAID port ID field and a RAID LU (Logical Unit) ID field. The IP address of the host in question is registered in the apparatus ID field. The file system used in the host in question is registered in the FS field. The port of a RAID executing the file system is registered in the port ID field. The ID of a logical unit is registered in the LU ID field.

The information to be registered in the host DB is collected from an agent on the host. That is, an agent is designed to operate in each host as soon as the system starts up, so that information to be registered in the host DB can be acquired in response to a query issued to the agent.

Next, description will be made on the zone. In any one of the views of FIGS. 3 to 7, a zone can be specified from a menu displayed by right click of each symbol. The zone means a pack of exclusively accessible regions. For example, when a host is assigned to have access to a RAID and others are not allowed to gain access to the RAID, the region of the RAID is a zone. As described above, a zone can be specified by right click. More specifically, a zone name to which an object of a selected symbol belongs, or all the zones can be selected. A zone may be defined in accordance with a practical record of access thereto. A zone can be known by a query issued to a switch. Therefore, when a zone is specified, a query is issued to a switch so as to detect an object belonging to the zone. Thus, the extent of the zone is highlighted.

Next, specific examples of storage configuration displays will be described with reference to FIGS. 10 to 14.

Figures 10, 11:
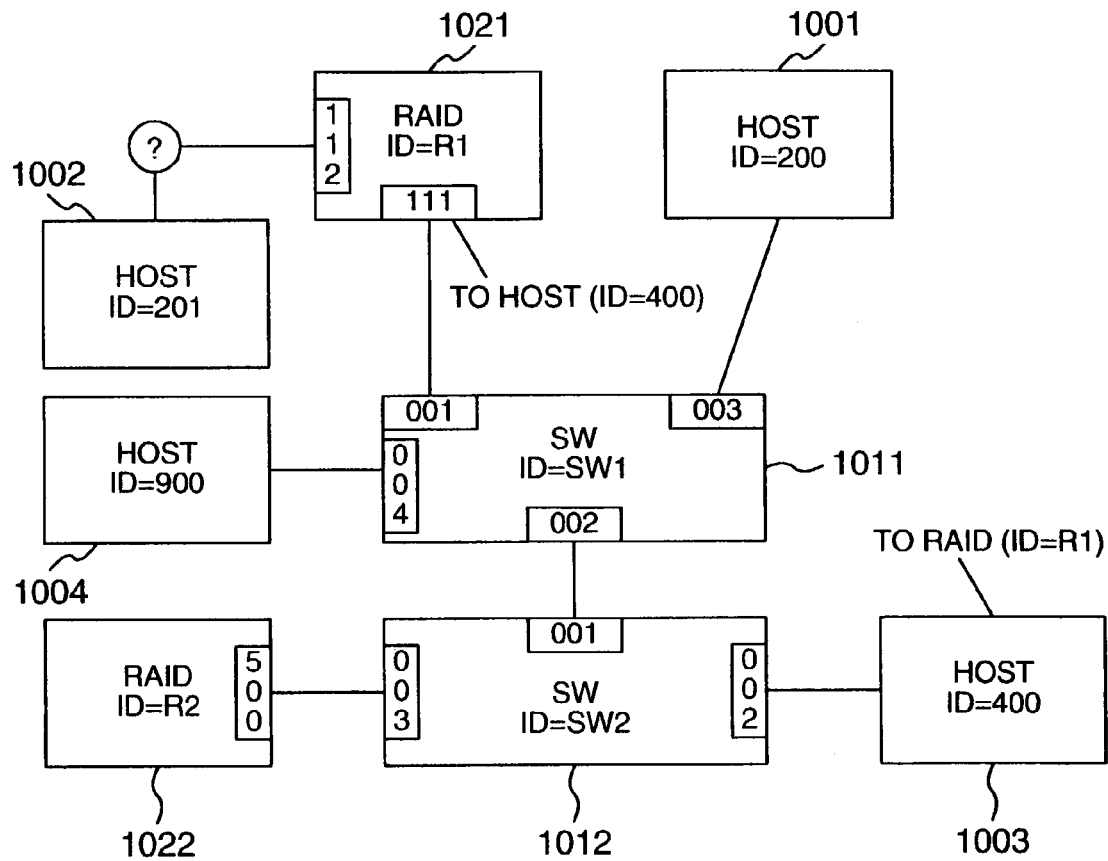
FIG. 10 is a diagram showing an example of the configuration of a storage network.
FIG. 11 is a view showing an example of a host DB in the aforementioned configuration example.

FIG. 10 shows an example of the configuration of a storage network. Assume that the ID of a host 1001 is 200, the ID of a host 1002 is 201, the ID of a host 1003 is 400, and the ID of a host 1004 is 900. Assume that the ID of a switch 1011 is SW1, and the ID of a switch 1012 is SW2. Assume that the ID of a RAID 1021 is R1, and the ID of a RAID 1022 is R2. As for the switches and the RAIDs, a port ID is written in each portion to be connected to a connection line. For example, the host 1001 is connected to a port of the switch 1011 whose port ID is 003. Although it is proved that the host 1002 is connected to a port of the RAID 1021 whose port ID is 112, the route is unclear. Therefore, the sign "?" is inserted into the connection line.

FIGS. 11 to 13 show the contents of the host DB, the switch DB and the RAID-DB in the case of FIG. 10. The data in those DBs are collected by the administration server 131 in the aforementioned procedure.

Figure 14:
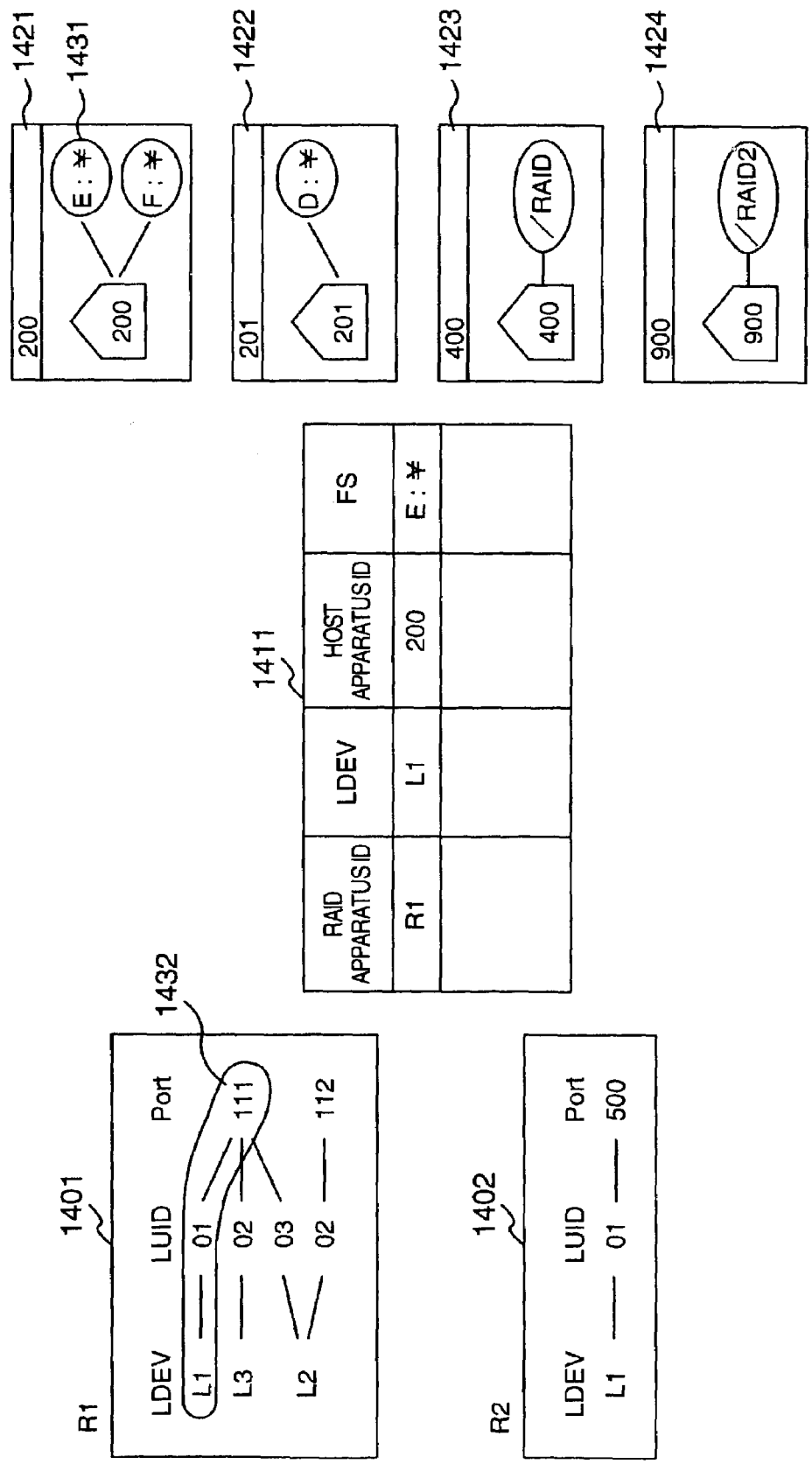
FIG. 14 is a view showing an example of display in the aforementioned configuration example.

The view 1401 in FIG. 14 designates an example of a storage device view about the RAID whose ID is RI in the case of FIG. 10. In practice, the storage device view is displayed by use of symbols as shown in FIG. 6. In FIG. 14, however, the storage device view is shown by a simplified hierarchy diagram. The Port column designates channel adapters of the RAID in question. The LUID column designates logical units accessible from the channel adapters.

The LDEV column designates logical devices corresponding to the logical units. The view 1402 is similar to the view 1401.

The views 1421 to 1424 designate host views of the hosts 1001, 1002, 1003 and 1004 respectively. In order to generate such a host view, a correspondence relationship as shown in the table 1411 may be acquired from the data of FIGS. 11 to 13.

Incidentally, when the portion 1431 in the host view 1421 is double-clicked, the storage device view 1401 is displayed. On this occasion, the region 1432 is highlighted. In addition, when zone display is specified as to the host 1001 (ID=200), the region 1432 in the storage device view 1401 is highlighted.

As described above in detail, according to the present invention, configuration information is acquired not by use of an interface unique to a storage network but by use of a control network of TCP/IP or the like. It is therefore unnecessary to extend an extra function for displaying the configuration on the storage network side, and it is possible to display the storage configuration in a more general-purpose system. That is, it is possible to collect and display storage information without depending on a specific piece of apparatus, and it is possible to grasp each piece of apparatus in association with other pieces of apparatus.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method for displaying the configuration of a storage network, comprising the steps of:
   connecting each piece of apparatus of hosts, switches and disk units constituting said storage network to a control network different from said storage network connecting said pieces of apparatus to one another;
   broadcasting a ping to acquire an IP address from each connected piece of apparatus;
   retrieving the acquired IP address from an apparatus database having at least an IP address field and an apparatus classification field;
   detecting, when there is an IP address newly discovered as a result of the retrieval in said retrieving step, apparatus classification of each piece of apparatus relating to the newly discovered IP address included in said storage network by use of identification information common to each piece of apparatus to register the acquired information in the apparatus database;
   issuing, when the apparatus classification cannot be detected by use of the common identification information, a query unique to a switch when said detected apparatus classification of each piece of apparatus is a switch, so as to acquire information about which piece of apparatus is connected to which port of said switch, and issuing a query unique to a RAID when said detected apparatus classification of each piece of apparatus is a RAID, so as to acquire information about which host has access to disks of said RAID to register the acquired information in the apparatus database;
   generating a screen for displaying the configuration of said storage network based on said acquired information; and
   displaying said generated screen.

2. A method for displaying the configuration of a storage network according to claim 1, wherein said control network is a TCP/IP network.

3. A method for displaying the configuration of a storage network according to claim 2, wherein said screen for displaying the configuration of said storage network includes a fabric view indicating the connection relationship among hosts, switches connected to said hosts, and disk units connected to said switches.

4. A method for displaying the configuration of a storage network according to claim 2, wherein said screen for displaying the configuration of said storage network includes a storage device view indicating the connection relationship among logical devices in disk units, logical units corresponding to said logical devices, and ports of switches using said logical units.

5. A computer readable medium, comprising computer executable instructions that, when executed by a computer, are for:
   connecting each piece of apparatus constituting a storage network to a control network different from said storage network connecting said pieces of apparatus to one another;
   broadcasting a ping to acquire an IP address from each connected piece of apparatus;
   retrieving the acquired IP address from an apparatus database having at least an IP address field and an apparatus classification field;
   detecting when there is an IP address newly discovered as a result of the retrieval in said retrieving step, apparatus classification of each piece of apparatus relating to the newly discovered IP address included in said storage network by use of identification information common to each piece of apparatus to register the acquired information in the apparatus database;
   issuing, when the apparatus classification cannot be detected by use of the common identification information, a query unique to a switch when said detected apparatus classification of each piece of apparatus is a switch, so as to acquire information about which piece of apparatus is connected to which port of said switch, and issuing a query unique to a RAID when said detected apparatus classification of each piece of apparatus is a RAID, so as to acquire information about which host has access to disks of said RAID to register the acquired information in the apparatus database;
   generating a screen for displaying the configuration of said storage network based on said acquired information; and
   displaying said generated screen.

6. A method for displaying the configuration of a storage network, comprising the steps of:
   connecting each piece of apparatus of hosts, switches and disk units constituting said storage network to a control network different from said storage network connecting said pieces of apparatus to one another;
   detecting apparatus classification of each piece of apparatus included in said storage network by use of said control network;
   issuing a query unique to a switch when said detected apparatus classification of each piece of apparatus is a switch, so as to acquire information indicating which piece of apparatus is connected to which port of said switch, and issuing a query unique to a RAID when said detected apparatus classification of each piece of apparatus is a RAID, so as to acquire information indicating which host has access to disks of said RAID;

generating a screen display for displaying the configuration of said storage network based on said acquired information, said configuration showing connection relationship among said hosts, said switches and said disk units indicated by symbols respectively corresponding to said hosts, said switches and said disk units;

displaying said screen display; and displaying connection relationship of one of said symbols on said displayed screen display when said one symbol is clicked, in order to display configuration of connection relationship relating which piece of apparatus is connected to which port of a switch when said one symbol is said switch, and display configuration of connection relationship relating which host has access to disks of a RAID when said one symbol is said RAID.

* * * * *